(12) United States Patent
Kay

(10) Patent No.: US 7,856,402 B1
(45) Date of Patent: Dec. 21, 2010

(54) VIDEO FINANCIAL DEPOSIT

(75) Inventor: Aaron Robert Kay, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/098,619

(22) Filed: Apr. 7, 2008

(51) Int. Cl.
G06Q 40/00 (2006.01)
(52) U.S. Cl. .............................. 705/42; 705/44; 705/35; 705/45; 455/422; 386/68; 382/135; 382/100; 358/1.15; 725/32; 235/379
(58) Field of Classification Search ................. 235/379; 705/35, 45, 42, 44; 382/100, 135, 104; 455/422; 725/32; 386/68; 358/1.15
See application file for complete search history.

(56) References Cited

U.S. PATENT DOCUMENTS

| | | | | |
|---|---|---|---|---|
| 4,205,780 | A * | 6/1980 | Burns et al. | 235/454 |
| 5,631,984 | A * | 5/1997 | Graf et al. | 382/317 |
| 6,411,725 | B1 * | 6/2002 | Rhoads | 382/100 |
| 6,546,119 | B2 * | 4/2003 | Ciolli et al. | 382/104 |
| 7,200,255 | B2 * | 4/2007 | Jones et al. | 382/135 |
| 2002/0072974 | A1 | 6/2002 | Pugliese et al. | |
| 2004/0170259 | A1 | 9/2004 | Park | |
| 2005/0097046 | A1 | 5/2005 | Singfield | |
| 2006/0004660 | A1 * | 1/2006 | Pranger | 705/43 |
| 2006/0279628 | A1 | 12/2006 | Fleming | |
| 2007/0094088 | A1 | 4/2007 | Mastie et al. | |
| 2007/0288382 | A1 * | 12/2007 | Narayanan et al. | 705/45 |
| 2008/0219543 | A1 * | 9/2008 | Csulits et al. | 382/135 |

OTHER PUBLICATIONS

Craig, Ben; "Resisting Electronic Payment Systems: Burning Down the House?" Federal Reserve Bank of Cleveland, Jul. 1999, pp. 1-4, ISSN 0428-1276. Retrieved from Internet <https://www.clevelandfed.org/Research/commentary/1999/0701.pdf>.
WallStreetGrapevine.com: Stocks on the Rise: JADG, BKYI, MITK; M2 Presswire, Mar. 3, 2008.

* cited by examiner

*Primary Examiner*—Harish T. Dass
(74) *Attorney, Agent, or Firm*—Chadbourne & Parke, LLP; Walter G. Hanchuk

(57) ABSTRACT

A video of a negotiable instrument may be provided from a user to a financial institution so that an image of the negotiable instrument may be obtained from the video and deposited in a user's bank account. In an implementation, a user may use a device such as a video camera, a web camera, or a video-enabled phone to convert an endorsed check into a video data file by making a video of the check and storing the video in a video data file. The user may send the video data file to the financial institution, where it may be processed and deposited in an account associated with the user. Any technique for sending a video data file to the financial institution may be used.

15 Claims, 4 Drawing Sheets

VIDEO FINANCIAL DEPOSIT

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/098,609, and U.S. patent application Ser. No. 12/098,629, each filed on Apr. 7, 2008 and each entitled "Video Financial Deposit."

BACKGROUND

Checks typically provide a safe and convenient method for an individual such as a payor to purchase goods and/or services. To use a check, the individual usually opens a checking account, or other similar account, at a financial institution and deposits funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. To reduce such burdens for the payee, systems and methods have been developed to enable the remote deposit of checks. For example, the payee may scan a check in an electronic image using a scanning device and a computing device. The financial institution may then receive from the payee the electronic image of the check. The financial institution may then use the electronic image to credit funds to the payee. However, such a technique requires the generation and transmission of a still electronic image.

SUMMARY

A video of a negotiable instrument may be provided from a user to a financial institution so that an image of the negotiable instrument may be obtained from the video and deposited in a user's bank account.

In an implementation, after endorsing a check, a user may use a device such as a video camera, a web camera, or a video-enabled phone to convert the check into a video data file by making a video of the front and/or back of the check and storing the video in a video data file. The user may attach the video data file to an email and send the video data file to the financial institution, where it may be processed and deposited in an account associated with the user. Any technique for sending a video data file to the financial institution may be used.

In an implementation, the video data file may be provided by the user to a website associated with the financial institution from storage or via live streaming or saved streaming video.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
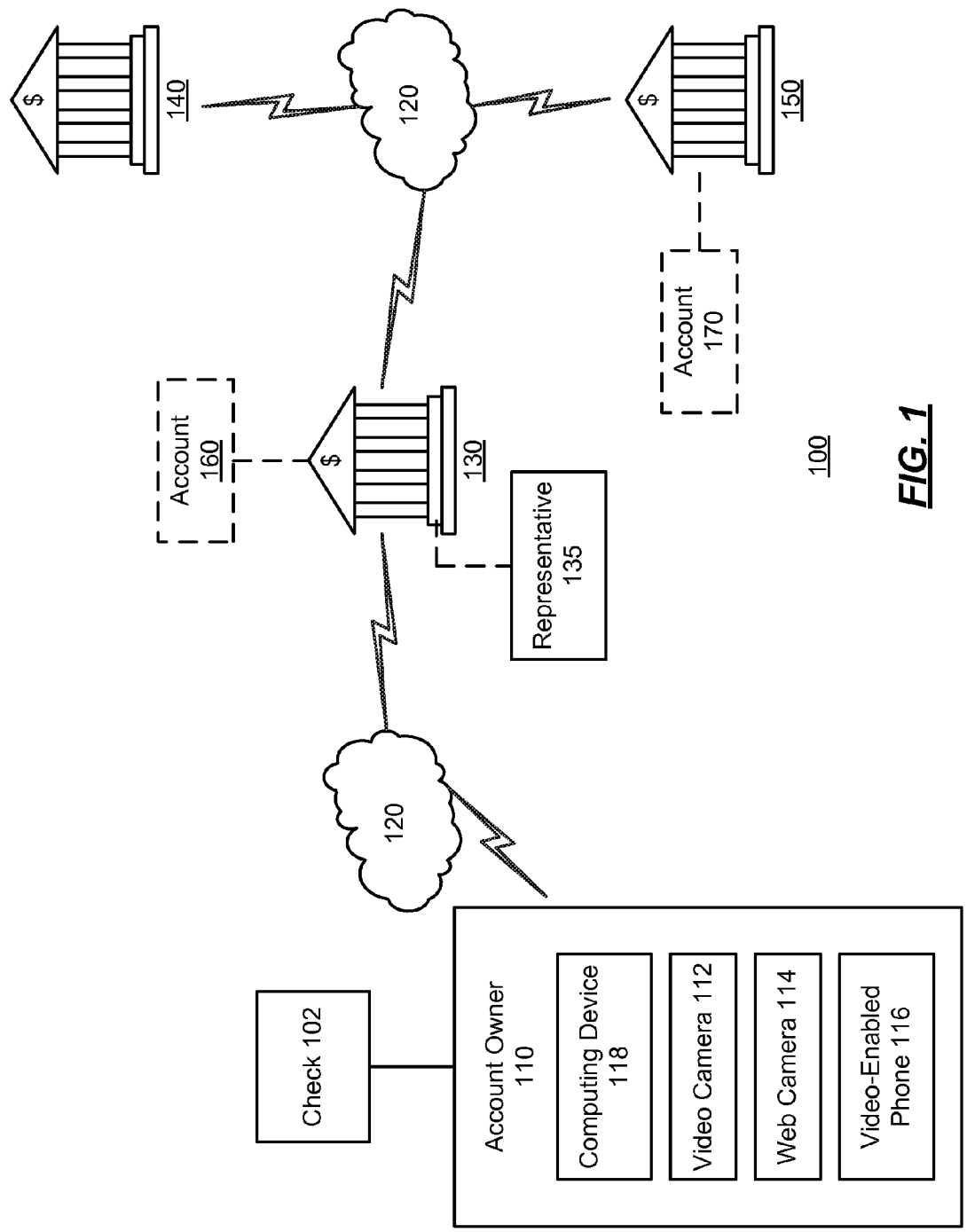
FIG. 1 is a block diagram of an implementation of a system in which example embodiments and aspects may be implemented.

FIG. 1 is a block diagram of an implementation of a system 100 in which example embodiments and aspects may be implemented. System 100 may include account owner 110 (also referred to herein as a user) and financial institutions 130, 140 and 150, which may be any type of entity capable of processing a transaction involving a negotiable instrument. For example, financial institutions 130, 140 and 150 may be a retail bank, an investment bank, an investment company, a regional branch of the Federal Reserve, a clearinghouse bank and/or a correspondent bank. A negotiable instrument typically includes a type of contract that obligates one party to pay a specified sum of money to another party. Negotiable instruments may include a check, a draft, a bill of exchange, a promissory note, and the like.

Account owner 110 may be an individual who owns account 160 that may be held at financial institution 130. Account 160 may be any type of account for depositing funds, such as a savings account, a checking account, a brokerage account, and the like. Account owner 110 may communicate with financial institution 130 by way of communications network 120 such as an intranet, the Internet, a local area network (LAN), a wide area network (WAN), a public switched telephone network (PSTN), a cellular network, a voice over Internet protocol (VoIP) network, and the like. Account owner 110 may communicate with financial institution 130 by phone, email, instant messaging, facsimile, and the like. Financial institutions 130, 140 and 150 also may communicate with each other by way of communications network 120.

In an implementation, account owner 110 may receive payment from another individual such as a payor in the form of a check 102 or other negotiable instrument that is drawn from account 170 at financial institution 150. Account owner 110 may endorse the check 102 (e.g., sign the back of the check 102) and indicate an account number on the check 102 for depositing the funds. It is noted that although examples described herein may refer to a check, the techniques and systems described herein are contemplated for, and may be used for, deposit of any negotiable instrument.

As described further herein, a video of a check or other negotiable instrument may be provided from a user to a financial institution so that an image of the check or negotiable instrument may be obtained from the video and may be deposited in a user's bank account. Account owner 110 may deposit the check 102 into account 160 by making a video of the check 102 and sending the data file containing the video (referred to herein as a video data file) to financial institution 130. For example, after endorsing the check 102, account owner 110 may use a device such as a video camera 112, a web camera 114, or a video-enabled phone 116, for example, to convert the check 102 into a video data file by making a video of the front and/or back of the check 102 and storing the video in a video data file.

In an implementation, account owner 110 may then attach the video data file to an email and send the video data file to financial institution 130 using the same device used to make the video of the check 102 and/or convert the check 102 into the video data file, or another computing device 118. However, any technique for sending a video data file to financial institution 130 may be used, such as providing a video data file to a website associated with financial institution 130 from storage, or providing a video data file to financial institution 130 via live streaming or saved streaming video.

The computing device 118 may be integral with the device used to make the video and/or video data file or separate from the device used to make the video and/or video data file. An example computing device 118 is described with respect to FIG. 4. Generation of a video and/or video data file of a check 102 is not limited to a video camera, a web camera, and a video-enabled phone, and it is contemplated that any device that is capable of generating a video may be used to make a video of the check 102 which may be sent to financial institution 130 as a video data file. Additional devices that may be used in the generation and/or transmission of a video data file include a web-enabled video computing device, a mobile phone, a camcorder, and a computer camera, for example.

Financial institution 130 may receive a video data file representing the check 102 and may use any known video processing software or other application(s) to obtain the relevant data of the check 102 from the video. Financial institution 130 may determine whether the financial information associated therewith may be valid. For example, financial institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the video data file from the payee.

The electronic devices may receive the video data file and may perform an initial analysis on the quality of the video in the video data file, the readability of the data contained therein, or the like. For example, the electronic devices may determine whether the account number, amount payable, and the like may be readable such that it may be parsed or otherwise obtained and processed by the financial institution to credit an account associated with the payee and debit an account associated with the payor. In an implementation, a representative 135 of financial institution 130 may provide assistance to account owner 110 and may provide assistance in determining whether the financial information may be readable and/or of a good enough quality to be processed, as described further herein.

Upon receipt and approval of the video data file, financial institution 130 may credit the funds to account 160. Financial institution 130 may clear the check 102 by presenting a digital image of the check 102 captured from the video data file to an intermediary bank, such as a regional branch of the Federal Reserve, a correspondent bank and/or a clearinghouse bank. For example, the check 102 may be cleared by presenting the digital image to financial institution 140, which may be a regional branch of the Federal Reserve, along with a request for payment. Financial institution 130 and 150 may have accounts at the regional branch of the Federal Reserve. Financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 2:
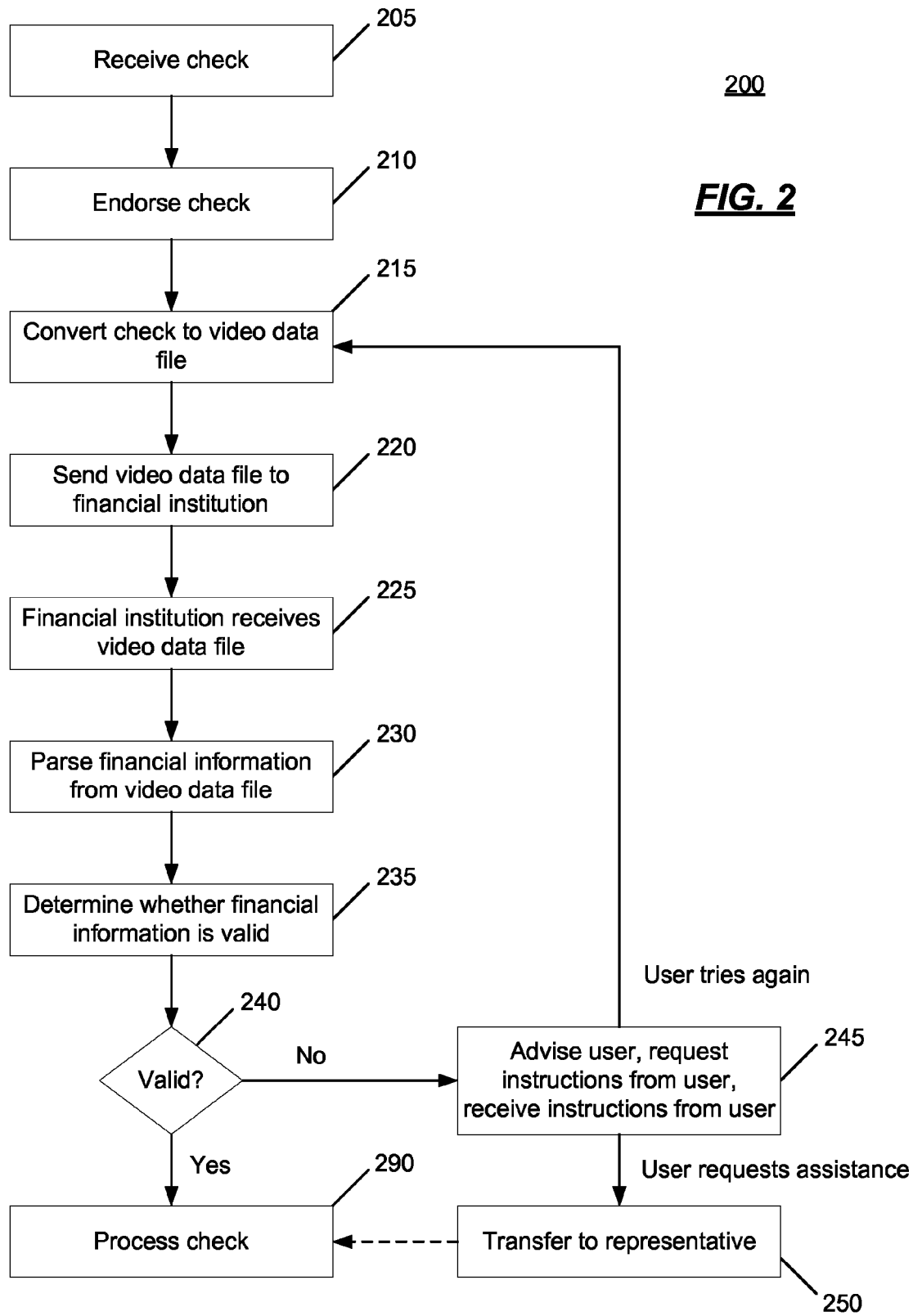
FIG. 2 is an operational flow of an implementation of a method that may be used to provide video financial deposit.

A check or other negotiable instrument may be deposited in a financial institution, such as a bank, using a stored video of the check or negotiable instrument that the user sends to the financial institution. FIG. 2 is an operational flow of an implementation of a method 200 that may be used to provide video financial deposit. At 205, an account owner (i.e., the payee, referred to herein as a user) may receive a check from a third party (i.e., the payor). At 210, the user may endorse the check by signing the back of the check in the designated field. If the user wishes to deposit the check into an account, such as a savings and/or checking account, they also may write an account number below the signature.

At 215, the user may convert the check into a video data file that comprises electronic data representing a video of the check. For example, the user may create a video data file comprising a video of the first side of the check, the second side of the check, or both. The video data file may be created using a video camera, a web camera, a video-enabled phone, a web-enabled video computing device, a mobile phone, a camcorder, a computer camera, a personal computer (PC), and the like.

At 220, the user may transmit the video data file to a financial institution, such as a bank, that may be associated with an account for depositing funds. For example, the user may send the video data file of the check to the financial instruction by attaching the video data file to an email. Alternatively, the video data file may be sent using various means, including, but not limited to, an Internet connection via a website of the financial institution or a wireless cellular transmission.

Additionally, the video data file may be augmented by secondary data which may be information relating to the check, such as an account number, a deposit amount, or a routing number associated with the check, and/or relating to the account for depositing funds, such as the account number and/or the name on the account. The account number may appear on the check itself, below the signature endorsing the check. The account number and/or name on the account also may appear in an email, either with or without the video data file, for example. The user may send the video data file and the secondary data to the financial institution along with a request to deposit the check into a particular user account.

At 225, the financial institution may receive the video data file pertaining to the check along with financial information pertaining to the account for depositing funds and any secondary data. In an implementation, the financial institution may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the financial institution, which may process the deposit request according to the video data file, the secondary data, and the selected account.

At 230, the financial institution may open the video data file and process the video using any known technology to retrieve financial information regarding the check. Example technologies that may be used by the financial institution may include video editing, capturing still frames from video, filtering to remove imagery except the check in the received video, image sharpening, and technologies to distinguish between the front and the back sides of the check.

At 235, after retrieving the financial information from the check in an electronic data representation form, the financial institution may determine whether the financial information such as the amount payable to the user, the account associated with the user to deposit funds, an account associated with a payor to debit funds, and a financial institution associated with the payor and/or the payee may be valid. For example, the financial institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the financial institution to credit an account associated with the payee and debit an account associated with the payor.

At 240, if the financial information is determined to be valid, the electronic data representation may be processed by the financial institution at 290, thereby depositing the check in the user's account. If the financial information is determined to be invalid at 240, then the user may be advised at 245. For example, the financial institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the video deposit again (e.g., make another video data file and send it to the financial institution) or whether the user would like assistance from a representative, for example. The user may indicate how they would like to proceed. If the user would like to try the video deposit again, processing may continue at 215.

If the user would like assistance, the financial information may be transferred to a representative for further review at 250. The representative, such as a customer service representative, a bank teller that may be located at a branch, a virtual bank teller that may be located remotely via an electronic device, or the like, may review the financial information associated with the electronic data representation to determine whether to allow the electronic data representation to be processed by the financial institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the financial institution at 290, thereby depositing the check in the user's account.

The user may receive a notice via email, facsimile, instant message, or mail, for example, that the check has been deposited into the selected account. In an implementation, if the check is not successfully deposited by video deposit, the financial institution may provide additional options to the user on how to redeem the check, such as mailing the check to the financial institution or the like.

In an implementation, the financial institution may receive a decision from a representative on whether to credit the funds to an account. For example, a representative such as a virtual teller may make a decision such as to approve or deny processing of the electronic data representation. According to an embodiment, a virtual teller may fill in the invalid financial information. For example, the virtual teller may issue a decision to approve the electronic data representation and may fill in the financial information deemed invalid from the initial analysis based upon inspection or review by the teller. The financial institution may then receive the invalid information from the virtual bank teller such that the electronic data representation may be processed.

In an implementation, at 290, the financial institution may process the electronic data representation of the check. For example, the financial institution may credit the funds to an account associated with the individual if, based on the decision received from the representative, the financial information may be approved. Additionally, the financial institution may credit the funds to an account associated with the user if, based on the determination, the financial information may be valid. The credit may be a provisional credit, enabling the user to access the funds while the check is being cleared. A provisional credit may be voided if the bank determines that the transaction is erroneous and/or fraudulent. Additionally, to credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN).

The ACH service provider may process the debit entry by identifying the account and bank from which the check may be drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

Figure 3:
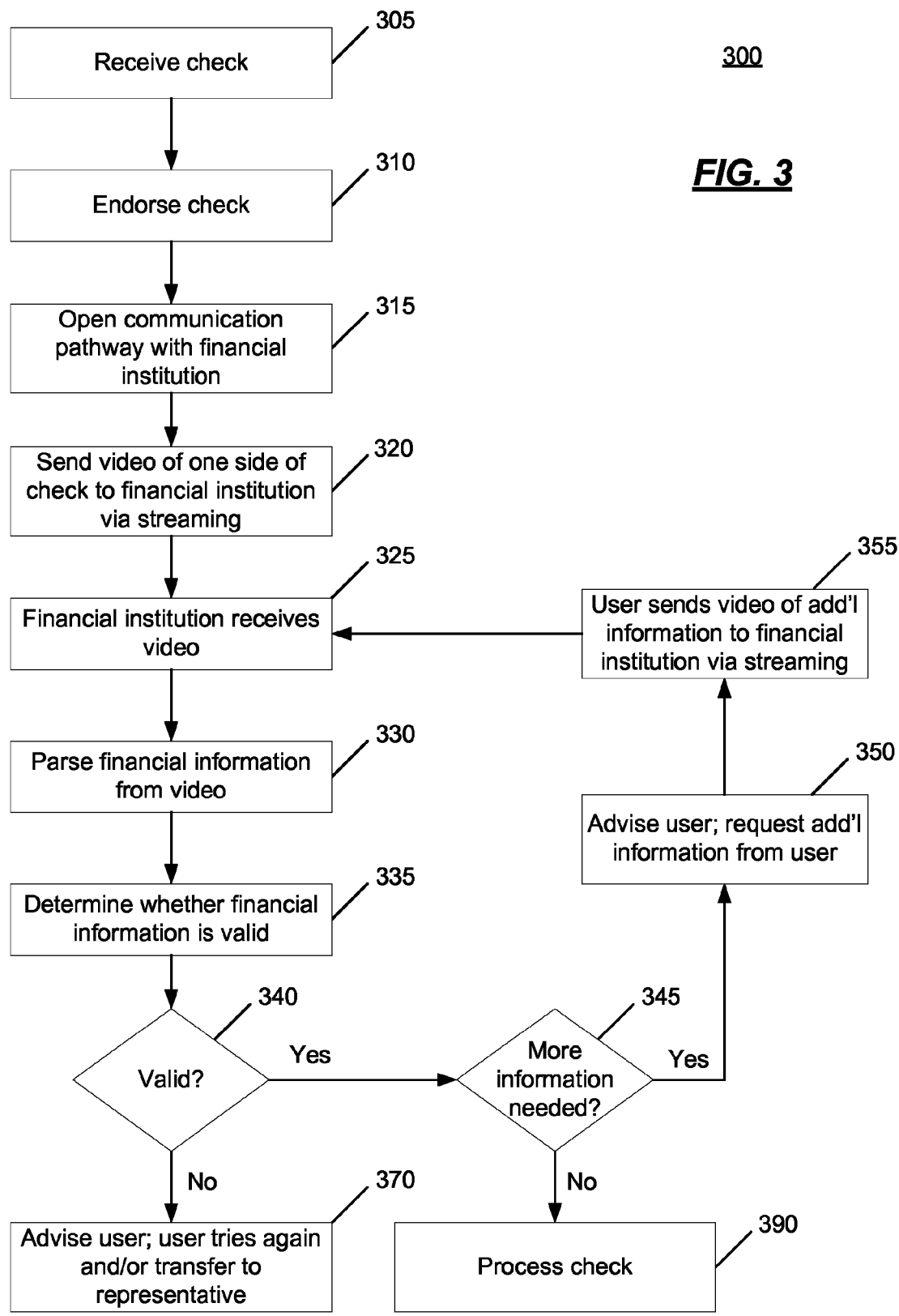
FIG. 3 is an operational flow of another implementation of a method that may be used to provide video financial deposit.

FIG. 3 is an operational flow of another implementation of a method 300 that may be used to provide video financial deposit. A check or other negotiable instrument may be deposited in a financial institution, such as a bank, using a streamed video of the check or negotiable instrument that the user sends to the financial institution. The streamed video may be provided from a live streaming video feed or from storage. Streamed video provided from storage may be referred to as webvideo or video on demand.

At 305, an account owner (i.e., the payee, referred to herein as a user) may receive a check from a third party (i.e., the payor). At 310, the user may endorse the check by signing the back of the check in the designated field and writing an account number below the signature.

At 315, the user opens a communication pathway with a financial institution by logging into a website for the financial institution. There may be several ways in which a communication pathway may be established, including, but not limited to, an Internet connection via a website of financial institution. The user may access the website and log into the website using credentials, such as, but not limited to, a password and a username. The user may send a request to deposit the check and may select a type of account in which to deposit the check.

At 320, a video data file is sent to the financial institution for processing. The video data file may be sent using various means, including, but not limited to, an Internet connection via the website or a wireless cellular transmission. The video data file may be sent via streaming using a live video feed or video that had been previously taken and stored by the user.

Streaming refers to playing or otherwise processing data such as video in real-time as it is downloaded over the Internet as opposed to storing it in a local file first. Streaming video avoids the delay entailed in downloading an entire video file and then playing or processing it. Thus, data is streaming when it is moving quickly from one computing device to another and does not have to be all in one place for the destination device to do something with it. In an implementation, a video data file of a negotiable instrument, such as a check, provided by the user does not have to be fully downloaded or received by the financial institution before the financial institution can begin processing it.

A video stream can be on demand as in the case of a webvideo or live. On demand streams are stored on a user computing device, and may be transmitted to the financial institution at the user's request or the financial institution's request. Live streams are only available at one particular time, as when a user is providing a video of their endorsed check live in real-time to the financial institution. Any known streaming techniques and technologies may be used to provide a video of a negotiable instrument, such as a check, from a user to a financial institution. The video may be in the form of a video data file that is generated and provided by a video camera, a web camera, a video-enabled phone, a web-enabled video computing device, a mobile phone, a camcorder, a computer camera, a PC, and the like, for example. In an implementation, the user may hold an endorsed check in front of a video camera which transmits a video of the check to the financial institution (e.g., a website of the financial institution).

At 325, the financial institution receives the video data file of the endorsed check via streaming and processes the video data file at 330. The video data file may be processed as it is received to retrieve financial information regarding the check using any known video processing technology, such as video editing, capturing still frames from video, filtering to remove imagery except the check in the received video, image sharpening, and technologies to distinguish between the front and the back sides of the check.

At 335, the financial institution may determine whether the financial information received in the video data file may be valid. The financial institution may determine whether information it has obtained regarding the check from the video is readable. Retrieved information may include the amount payable to the individual, the account associated with the individual to deposit funds, an account associated with a payor to debit funds, and a financial institution associated with the payor and/or the payee. Similar to that described with respect to the method 200, for example, the financial institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the financial institution to credit an account associated with the payee and debit an account associated with the payor.

At 340, if the financial information is determined to be valid, it is determined at 345 if more information is needed from the user before depositing the check. Such information may include data from another side of the check (e.g., the back of the check, the front of the check, or some other information). If no additional information is needed at 345, the electronic data representation may be processed by the financial institution at 390 (similar to 290 described with respect to the method 200), thereby depositing the check in the user's account. The user may receive a notice via email, facsimile, instant message or mail, for example, that the check has been deposited into the appropriate account selected by the user.

If more information is needed from the user before depositing the check as determined at 345, the user may be advised at 350 and additional information may be requested from the user. The user may be advised by an email, a web message, an instant message, or the like transmitted from the financial institution to the user. The user may send video of the requested additional information via streaming at 355, with processing continuing at 325.

If the financial information is held to be invalid at 340, then the user may be advised at 370 via an email, a web message, an instant message, or the like from the financial institution to the user, indicating that the financial information associated with the electronic data representation may be invalid. The user may then determine how to proceed by selecting an option on the web message, replying to the email, or the like. In an implementation, similar to the method 200, if the financial information is held to be invalid, instructions on how the user would like to proceed may be requested from the user, such as whether the user would like to try the video deposit again or whether the user would like assistance from a representative, for example. The financial institution may also provide additional options on how to redeem the check to the user such as mailing in the check or the like. The user may indicate how they would like to proceed. Thus, in an implementation, the user may try streaming a video of the check to the financial institution again and/or may be transferred to a representative of the financial institution for assistance.

In this manner, there may be two-way communication between the financial institution and the user in real-time. For example, a user may hold one side of a check (e.g., the front) up to a web-enabled video camera, webcam, etc., and the financial institution's website may read the data on the front of the check. When the financial institution has captured the needed data, the user may be advised (e.g., via the website, instant messaging, video instant messaging, an applet of the Internet, a text interface with the video interface, etc.) and instructed to turn the check over. The website may then read the other side of the check (e.g., the back), and advise the user when the data has been captured. The financial institution may then deposit the check based on the captured data and advise the user. The user may then destroy or otherwise void the check (e.g., by writing "void" on the check).

Exemplary Computing Arrangement

Figure 4:
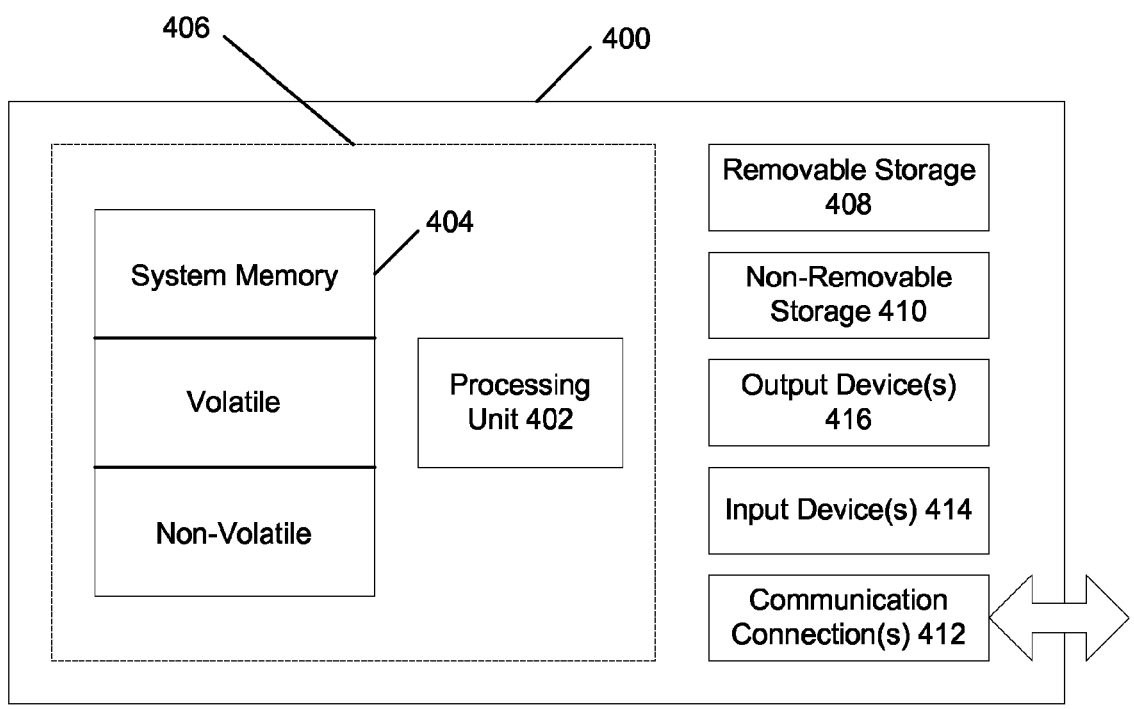
FIG. 4 is a block diagram of an example computing environment in which example embodiments and aspects may be implemented.

FIG. 4 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and system memory 404. Depending on the exact configuration and type of computing device, system memory 404 may be volatile (such as RAM), non-volatile (such as read-only memory (ROM), flash memory, etc.), or some combination of the two. This most basic configuration is illustrated in FIG. 4 by dashed line 406.

Computing device 400 may have additional features and/or functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by computing device 400 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 404, removable storage 408, and non-removable storage 410 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communication connection(s) 412 that allow the computing device 400 to communicate with other devices. Communication connection(s) 412 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

Computing device 400 may be one of a plurality of computing devices 400 inter-connected by a network. As may be appreciated, the network may be any appropriate network, each computing device 400 may be connected thereto by way of communication connection(s) 412 in any appropriate manner, and each computing device 400 may communicate with one or more of the other computing devices 400 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of depositing a negotiable instrument, comprising:
    receiving streamed video data of a negotiable instrument;
    processing the streamed video data using a processor, including:
       distinguishing automatically between front and back sides of the negotiable instrument;
    obtaining financial transaction information from depictions of the negotiable instrument in the streamed video data based on the video processing; and
    depositing funds of the negotiable instrument into an account of a financial institution using the financial transaction information.

2. The method of claim 1, wherein receiving the streamed video data file comprises receiving a live streaming video feed from the user.

3. The method of claim 1, wherein receiving the streamed video data file comprises receiving a stored video from the user via streaming.

4. The method of claim 1, wherein receiving the streamed video data file of the negotiable instrument comprises receiving a first video comprising a first side of the negotiable instrument and a second video comprising a second side of the negotiable instrument.

5. The method of claim 4, further comprising determining if the first video comprises valid financial information, and if so, then requesting the second video from the user.

6. A computer-readable medium comprising computer-readable instructions for depositing a negotiable instrument, said computer-readable instructions comprising instructions that:
    receive streamed video data of a negotiable instrument;
    process the streamed video data using a processor, including:
       distinguish automatically between front and back sides of the negotiable instrument;
    obtain financial transaction information from depictions of the negotiable instrument in the streamed video data based on the video processing; and
    deposit funds of the negotiable instrument into an account of a financial institution using the financial transaction information.

7. The computer-readable medium of claim 6, wherein the instructions that receive the streamed video data file comprise instructions that receive a live streaming video feed from the user.

8. The computer-readable medium of claim 6, wherein the instructions that receive the streamed video data file comprise instructions that receive a stored video from the user via streaming.

9. The computer-readable medium of claim 6, wherein the instructions that receive the streamed video data file comprise instructions that receive a first video comprising a first side of the negotiable instrument and a second video comprising a second side of the negotiable instrument.

10. The computer-readable medium of claim 9, further comprising instructions that determine if the first video comprises valid financial information, and if so, then request the second video from the user.

11. A system for depositing a negotiable instrument, comprising:
    one or more computer devices;
    at least one subsystem of the one or more computer devices that receives streamed video data of a negotiable instrument;
    at least one subsystem of the one or more computer devices that:
       processes the streamed video data using a processor, including:
          distinguishes automatically between front and back sides of the negotiable instrument; and
       obtains financial transaction information from depictions of the negotiable instrument in the streamed video data based on the video processing; and
    at least one subsystem of the one or more computer devices that deposits funds of the negotiable instrument into an account of a financial institution using the financial transaction information.

12. The system of claim 11, wherein the at least one subsystem of the one or more computer devices that receives the streamed video data file comprises at least one subsystem that receives a live streaming video feed from the user.

13. The system of claim 11, wherein the at least one subsystem of the one or more computer devices that receives the streamed video data file comprises at least one subsystem that receives a stored video from the user via streaming.

14. The system of claim 11, wherein the at least one subsystem of the one or more computer devices that receives the streamed video data file of the negotiable instrument comprises at least one subsystem that receives a first video comprising a first side of the negotiable instrument and a second video comprising a second side of the negotiable instrument.

15. The system of claim 14, further comprising at least one subsystem of the one or more computer devices that determines if the first video comprises valid financial information, and if so, then requests the second video from the user.

* * * * *